United States Patent
Dunn et al.

(10) Patent No.: US 7,567,807 B2
(45) Date of Patent: Jul. 28, 2009

(54) APPARATUS AND METHOD FOR PERFORMING HANDOFF WITH A MOBILE STATION HAVING A SMART ANTENNA

(75) Inventors: Doug Dunn, Chula Vista, CA (US); Henry Chang, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 25 days.

(21) Appl. No.: 11/111,643

(22) Filed: Apr. 21, 2005

(65) Prior Publication Data

US 2006/0240827 A1    Oct. 26, 2006

(51) Int. Cl.
*H04Q 7/20* (2006.01)

(52) U.S. Cl. .................. 455/436; 455/437; 455/442; 455/443; 455/562.1

(58) Field of Classification Search ................ 455/436, 455/442, 443, 562.1, 437, 438, 439
See application file for complete search history.

(56) References Cited

U.S. PATENT DOCUMENTS

| | | | |
|---|---|---|---|
| 5,625,876 A * | 4/1997 | Gilhousen et al. ........... 370/331 |
| 6,122,260 A | 9/2000 | Liu et al. |
| 6,131,031 A * | 10/2000 | Lober et al. ................. 455/444 |
| 6,459,895 B1 | 10/2002 | Hastings et al. |
| 6,498,939 B1 * | 12/2002 | Thomas ................... 455/562.1 |
| 6,600,901 B1 | 7/2003 | Koehne et al. |
| 6,771,986 B1 | 8/2004 | Oh |
| 6,785,520 B2 | 8/2004 | Sugar et al. |
| 6,933,887 B2 * | 8/2005 | Regnier et al. .............. 342/372 |
| 7,009,559 B2 * | 3/2006 | Regnier et al. .............. 342/372 |
| 2001/0033600 A1 | 10/2001 | Yang et al. |
| 2002/0137538 A1 | 9/2002 | Chen et al. |
| 2003/0153312 A1 | 8/2003 | Lee et al. |
| 2003/0195017 A1 * | 10/2003 | Chen et al. ............... 455/562.1 |
| 2004/0082311 A1 | 4/2004 | Shiu et al. |
| 2004/0113851 A1 | 6/2004 | Gothard et al. |
| 2004/0143428 A1 * | 7/2004 | Rappaport et al. ............ 703/22 |
| 2005/0057394 A1 | 3/2005 | Lee |
| 2005/0136929 A1 * | 6/2005 | Iacono et al. ............... 455/436 |
| 2005/0176385 A1 * | 8/2005 | Stern-Berkowitz et al. .. 455/101 |

FOREIGN PATENT DOCUMENTS

WO    WO 03/77433    9/2003

* cited by examiner

*Primary Examiner*—Lester Kincaid
*Assistant Examiner*—Charles Shedrick

(57) ABSTRACT

Disclosed is a mobile station configured to perform soft, softer, and soft softer handoffs. The mobile station comprises a smart antenna module and a logic module which are configured to make use of signals that, up to now, have been categorized as noise, interference, or both. Using the heretofore unused signals allows the handset to perform all of its handoffs more efficiently and in conditions that previously would not have allowed a handoff, which prevents dropped calls and/or poor reception.

14 Claims, 7 Drawing Sheets

APPARATUS AND METHOD FOR PERFORMING HANDOFF WITH A MOBILE STATION HAVING A SMART ANTENNA

BACKGROUND

1. Field of the Invention

This invention relates to an apparatus and method for performing a soft handoff. More particularly, the invention relates to a mobile station apparatus configured to reclassify interfering RF signals as desired RF signals for soft handoff purposes.

2. Description of Related Art

In a wireless network multipath fading and interference are difficult problems to overcome. Multipath fading occurs when a transmitted signal takes more than one path to a receiver and some of the signals arrive out of phase, resulting in a weak or fading signal. Interference is an electromagnetic disturbance that interrupts, obstructs, or otherwise degrades or limits the effective performance of communications between the mobile station and the base station.

In order to combat multipath fading and interference, receivers incorporate rake receivers and smart antenna technologies. Rake receivers have the ability to selectively demodulate multipaths and combine them coherently at the mobile station receiver. Each of the rake receivers in a mobile station receiver may be used to demodulate a signal path from the same base station or the rake receiver may be used to demodulate a signal path from a different base station, i.e. a soft handoff scenario. A smart antenna augments the rake receiver performance by selecting the optimal received signal seen at the input of the rake receiver.

For purposes of this patent, the term "smart antenna" refers to various aspects of smart antenna system technology that includes intelligent antennas, phased arrays, spatial processing, beam forming, digital beam forming, adaptive antenna systems, and related adaptive RF technologies. An illustrative example of a smart antenna system is the INTELLICELL® smart antenna solution, developed by ArrayComm, Inc. of San Jose, Calif. In particular, the INTELLICELL® smart antenna uses an antenna array coupled with sophisticated digital signal processing to manage the energy that is radiated and received by a base station.

To date smart antenna systems have focused on communicating the "best" signal to the mobile station from a serving base station. In operation, these smart antenna systems scan for an RF signal in multiple antenna configurations and then proceed to determine which configuration results in the optimal received signal quality. Generally, the smart antenna system then avoids antenna configurations that would lead to high interference levels to improve signal quality.

However, technologies that use "soft handoff" have the benefit of combining signals from two or more base station transmitters to improve receiver performance. Except for RF signals generated from a serving base station, smart antenna systems interpret signals generated from any other base station as interference. Improperly interpreting a desired RF signal, which can be used for soft handoff purposes, as interference can degrade performance because the benefits of soft handoff are completely lost.

SUMMARY

A mobile station configured to perform a soft handoff is disclosed. The mobile station comprises a receiver and a smart antenna module. The receiver is configured to receive a plurality of similar RF signals that comprises a plurality of first RF signals generated by a first base station transmitter, and a plurality of second RF signals generated by a second base station transmitter. For illustrative purposes the first base station is the serving base station. The smart antenna module comprises a means for classifying the similar RF signals from the second base station transmitter as an interference signal when the first RF signals from the serving base station exceeds a first threshold.

The mobile station also comprises a logic component, which reclassifies the interference signal from the second base station transmitter as a desired signal when the first RF signals generated from the serving base station fall below the first threshold. The logic component also comprises a second threshold, which triggers an instruction to transmit a first signal strength associated with the first RF signals and a second signal strength associated with the second RF signals. The mobile station's transmitter than receives the instruction to transmit the first signal strength and the second signal strength to the serving base station, i.e. the first base station.

The mobile station then receives an instruction from the first base station transmitter to simultaneously demodulate and combine similar RF generated by the first base station transmitter and the second base station transmitter. The mobile station may be configured to perform a soft handoff, a softer handoff, a soft softer handoff, or any combination thereof.

DRAWINGS

The present invention will be more fully understood by reference to the following drawings which are for illustrative, not limiting, purposes.

DESCRIPTION

Persons of ordinary skill in the art will realize that the following description of the present invention is illustrative and not in any way limiting. Other embodiments of the invention will readily suggest themselves to such skilled persons having the benefit of this disclosure. It shall be appreciated by those of ordinary skill in the art that the apparatus described hereinafter may vary as to configuration and as to details. Additionally, the method may vary as to details, order of the actions, or other variations without departing from the inventive concepts disclosed herein.

The apparatus, system and methods described herein permits a mobile station with a smart antenna to perform a soft handoff. For purposes of this patent, the term "handoff" refers to the simultaneous demodulation and combining of RF signals generated by a first base station transmitter and a second base station transmitter. The invention determines whether or not RF signals that are generated by a nearby base station(s) should be treated as interference or should be considered for soft handoff purposes. In operation, the method analyzes a plurality of RF signals associated with various antenna configurations, and then proceeds to determine whether signals from a particular antenna configuration has RF signal components that can be combined in a soft handoff mode.

The term "soft handoff" is used interchangeably with the terms soft handover, softer handoff, softer handover, soft softer handoff, and any such combination thereof. A more detailed discussion of the some different types of soft handoffs is provided below. The use of the term "soft handoff" should not be confused with a hard handoff or hard handover, which requires a complete disconnect from one sector or cell before reconnecting to another sector or cell. A hard handoff or hard handover does not simultaneously demodulate and combine two or more signals from multiple sectors or base stations.

Figure 1:
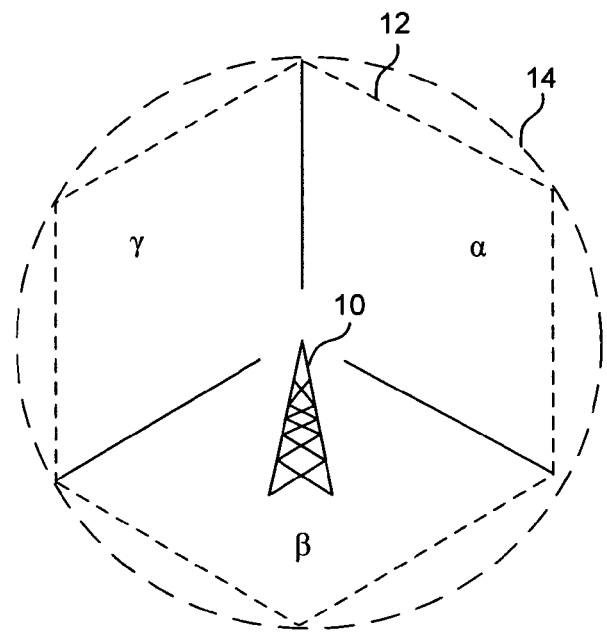
FIG. 1 shows an illustrative diagram of a base station having three sectors.

Referring to FIG. 1 there is shown an illustrative diagram of a base station having three sectors. Each sector has a base station transmitter. The base station 10 or "cell" provides a region of radio coverage. The illustrative base station 10 is divided into three sectors: alpha ($\alpha$), beta ($\beta$) and gamma ($\gamma$). For illustrative purposes, each base station sector includes directional antennas that typically transmit and receive in a beamwidth of 120° or more. The boundaries of the base station 10 are identified by the hexagon 12 and the circle 14. The hexagon 12 is used to illustrate the "face" or network boundary for each sector of base station 10. The circle 14 is used to show a more typical radiation pattern because cells do not have straight boundaries and are more rounded.

Figure 2:
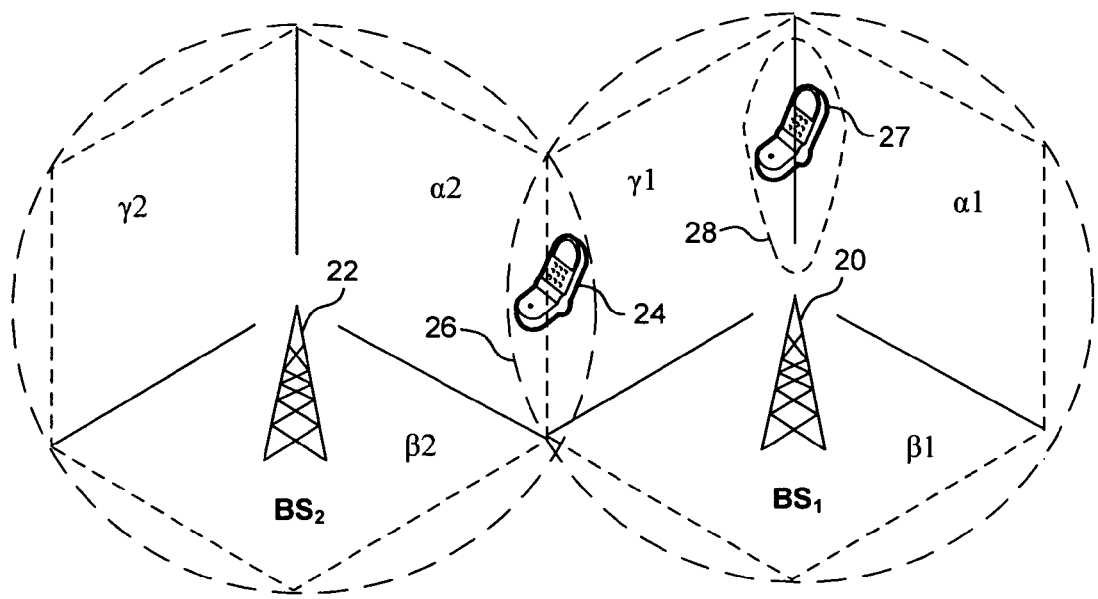
FIG. 2 shows an illustrative diagram showing the locations for a soft handoff and softer handoff.

Referring to FIG. 2 there is shown an illustrative diagram with two cells having an overlapping service area where a soft handoff occurs. An illustrative first base station 20 has three sectors $\alpha_1$, $\beta_1$ and $\gamma_1$. An illustrative second base station 22 also has three associated sectors, namely, $\alpha_2$, $\beta_2$ and $\gamma_2$. An illustrative mobile station 24 is located in an overlapping service area 26. For an illustrative Code Division Multiple Access (CDMA) system, this overlapping area is the location for a "soft handoff."

Soft handoff refers to the general concept of a mobile station being in communication with two or more base stations, and simultaneously demodulating and combining the RF signals received from the two or more base stations. In the illustrative CDMA system, the network has control over base stations communications with the mobile station. The mobile station may assist the network by providing the network with information about the signal strength for each base station. For example in a CDMA system, the mobile station reports the signal strength above a certain threshold. Based on the signal strength reported by the mobile station, the serving base station may instruct the mobile station to proceed with a soft handoff.

For example, if we assume that mobile station 24 is in communication with sector $\gamma_1$ of a first base station 20 and the mobile station 24 then detects a pilot from sector $\alpha_2$ of a second base station 22, a soft handoff may occur when the mobile station 24 is in simultaneous communication with sector $\gamma_1$ of the first base station 20 and sector $\alpha_2$ of the second base station 22. Sufficient signal strength is maintained to permit the mobile station 24 to communicate with both base stations. In CDMA networks, a soft handoff is possible because the same frequency channel is used by all base stations, i.e. cell sectors.

FIG. 2 also depicts the location for a "softer handoff." Softer handoff refers to the general concept of a mobile station simultaneously demodulating and combining signals received from the two or more base station transmitters which are associated with the same base station. For example, mobile station 27 is in communication with a first antenna (not shown) in sector $\alpha_1$ and a second antenna (not shown) in sector $\gamma_1$. The area 28 depicts a location where the signals that can be transmitted and received by the $\alpha_1$ antenna and the $\gamma_1$ antenna overlap. Thus a softer handoff occurs when a mobile station is communicating with two sectors, which are within the same cell or base station.

A soft handoff, softer handoff or combination thereof occurs in approximately 70% percent of CDMA calls placed in an urban environment. Those skilled in the art shall appreciate that there are other means of communicating, which use soft handoffs, softer handoffs, and any combination thereof. For example, Wideband Code Division Multiple Access (W-CDMA) functionally performs the same process of soft handoffs and softer handoffs. However, W-CDMA refers to these processes as a soft handover and a softer handover, and does not adopt the CDMA terms of soft handoff and softer handoff. Additionally, Orthogonal Frequency Division Multiplexing (OFDM) can be configured to perform soft and softer handoffs.

However, Time Division Multiple Access (TDMA) systems such as Global System for Mobility (GSM) conduct a "hard handover" or "hard handoff." A hard handoff or hard handover provides a complete disconnect from one sector or cell and then reconnects to another sector or another cell. A hard handoff or hard handover does not simultaneously demodulate and combine two or more signals from two base station transmitters.

Systems that rely exclusively on hard handoffs have a greater potential for dropped calls because a complete disconnect occurs before the mobile station is reconnected to the network. Soft handoffs do not result in a complete disconnect and the process of disconnecting is a gradual process that is based on inter alia signal strength. The result of a soft handoff is that the combined signals enhance the signal/noise ratio at the mobile station and reduce the frequency of dropped calls.

Figure 3:
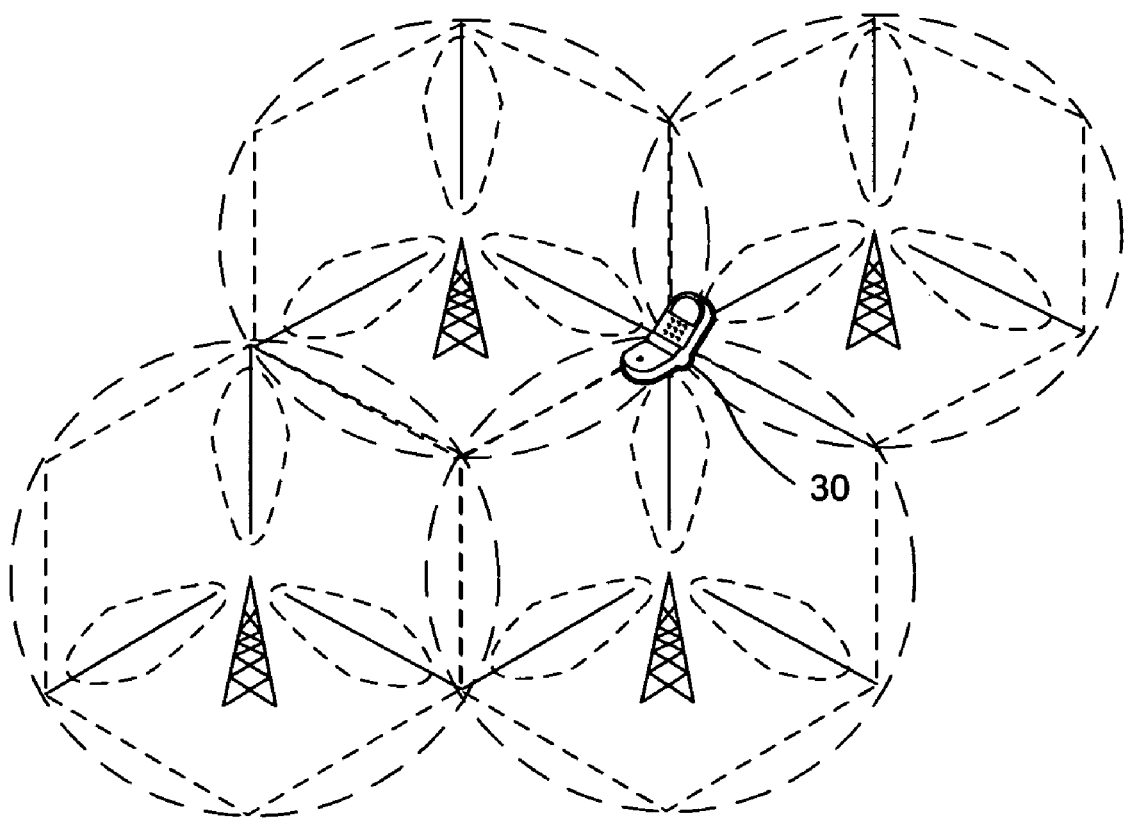
FIG. 3 shows an illustrative diagram of a soft softer handoff location.

Referring to FIG. 3 there is shown a soft softer handoff. The illustrative mobile station 30 is located at a point where it can communicate with three different base stations and six different sectors. In a soft softer handoff, there are at least three base station transmitters communicating with a mobile station, in which two base station transmitters occupy different sectors in a base station, and a third base station transmitter is located in a geographically separate base station. Those skilled in the art shall appreciate that there may be a variety of different combination of soft handoffs, softer handoffs, and any combination of soft softer handoff. Thus, the type of handoff is dependent on a host of variables including but not limited to the location of the mobile station, the location of the base stations, the number of sectors, and the coverage area for each sector and base station.

Figure 4:
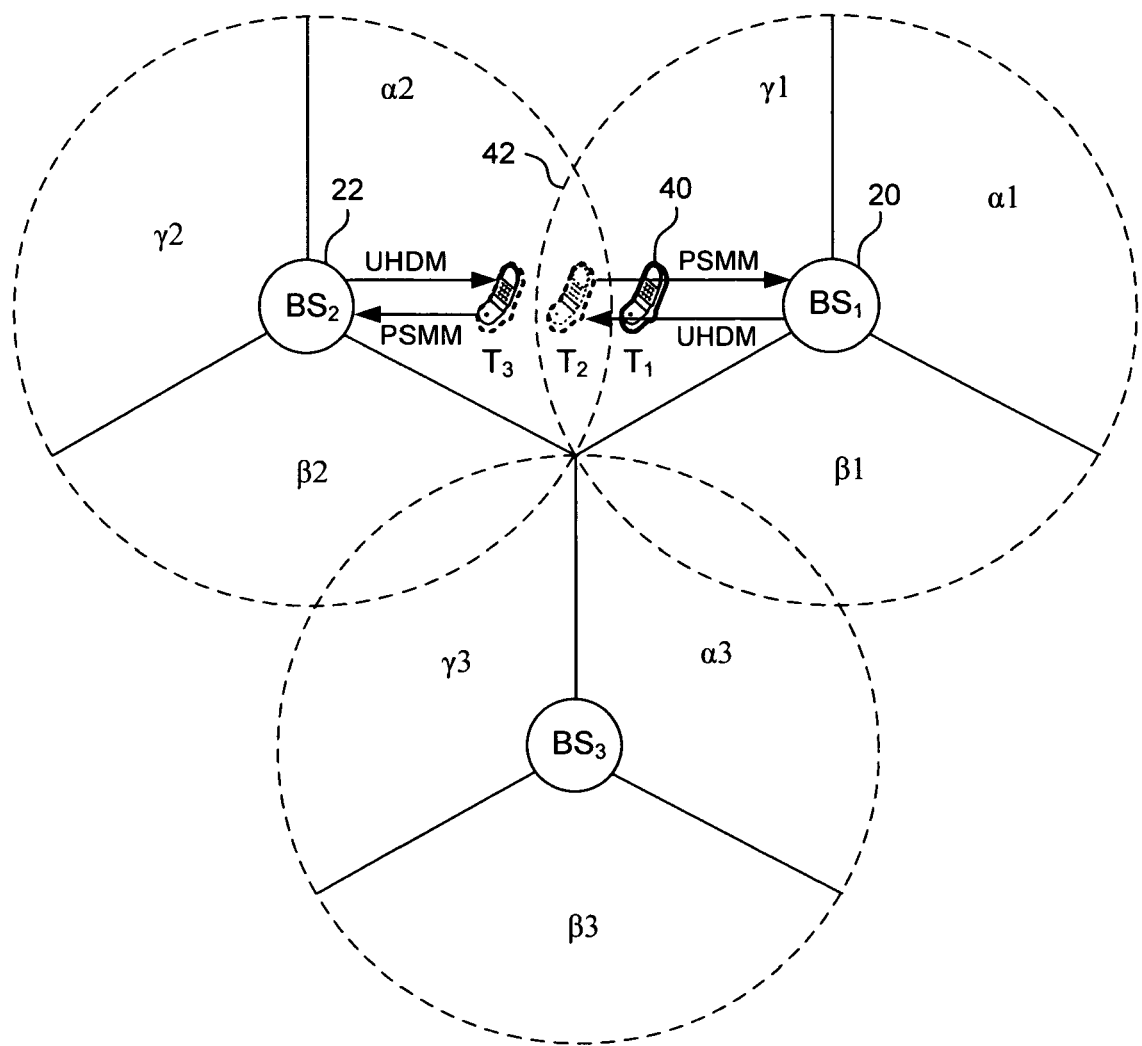
FIG. 4 shows an illustrative diagram in which a phone moves through a soft handoff area.

Referring to FIG. 4 there is shown an illustrative communication between the first base station 20 and a mobile station 40 in which a soft handoff occurs. The illustrative communications occurs in a CDMA network. For communication between the first base station 20 and the mobile station 40 to occur there must be an element in the "active set." The active set permits communications between one or more base station transmitters and a mobile station. The active set is a set of pilot signals or "pilots" granted by the serving base station 20 to the mobile station 40. When there are more than two elements in the active set, the mobile station can simultaneously demodulate and transmit to each element in the active set.

In the illustrative soft handoff, the mobile station 40 at $T_1$ in sector $\gamma_1$ moves to area 42 at $T_2$, which is the intersection between sector $\gamma_1$ and $\alpha_2$. In area 42, the mobile station measures a new pilot signal generated by sector $\alpha_2$ of the second base station 22. If the signal from the sector $\alpha_2$ of the second base station 22 exceeds a T_ADD threshold (e.g. −14 dB), the detection of this new pilot signal (which occurred when the mobile station moved to area 42) triggers the mobile station to send a Pilot Strength Measurement Message (PSMM) to the serving first base station 20. The PSMM states the current pilot strength associated with sector $\alpha_2$ of the second base station 22 along with the pilot strength of the serving sector $\gamma_1$ from the first base station 20. The pilot signal generated by sector $\alpha_2$ of the second base station 22 must exceed the illustrative T_ADD threshold to result in the mobile station 20 generating a PSMM. Those skilled in the art shall appreciate that this illustrative communication between mobile station 40, first base station 20, and second base station 22 describes how a soft handoff is performed.

When the serving base station 20 sees the PSMM, the serving base station 20 sends a general handoff message (GHDM) or universal handoff message (UHDM) that says "I will grant you both pilots." The mobile station 40 begins to simultaneously demodulate and combine signals from the first base station transmitter and the second base station transmitter.

If the signal falls below the T_DROP threshold (e.g. −16 dB), then the RF signal is dropped. In the illustrative example, the mobile station can receive RF signals from up to six base station transmitters. As the base station gets closer to the second base station 22 at $T_3$, this triggers a new PSMM because of the T_DROP of the signal from the first base station. The second base station 22 grants only one element in the active set, namely, the second base station.

Figure 5:
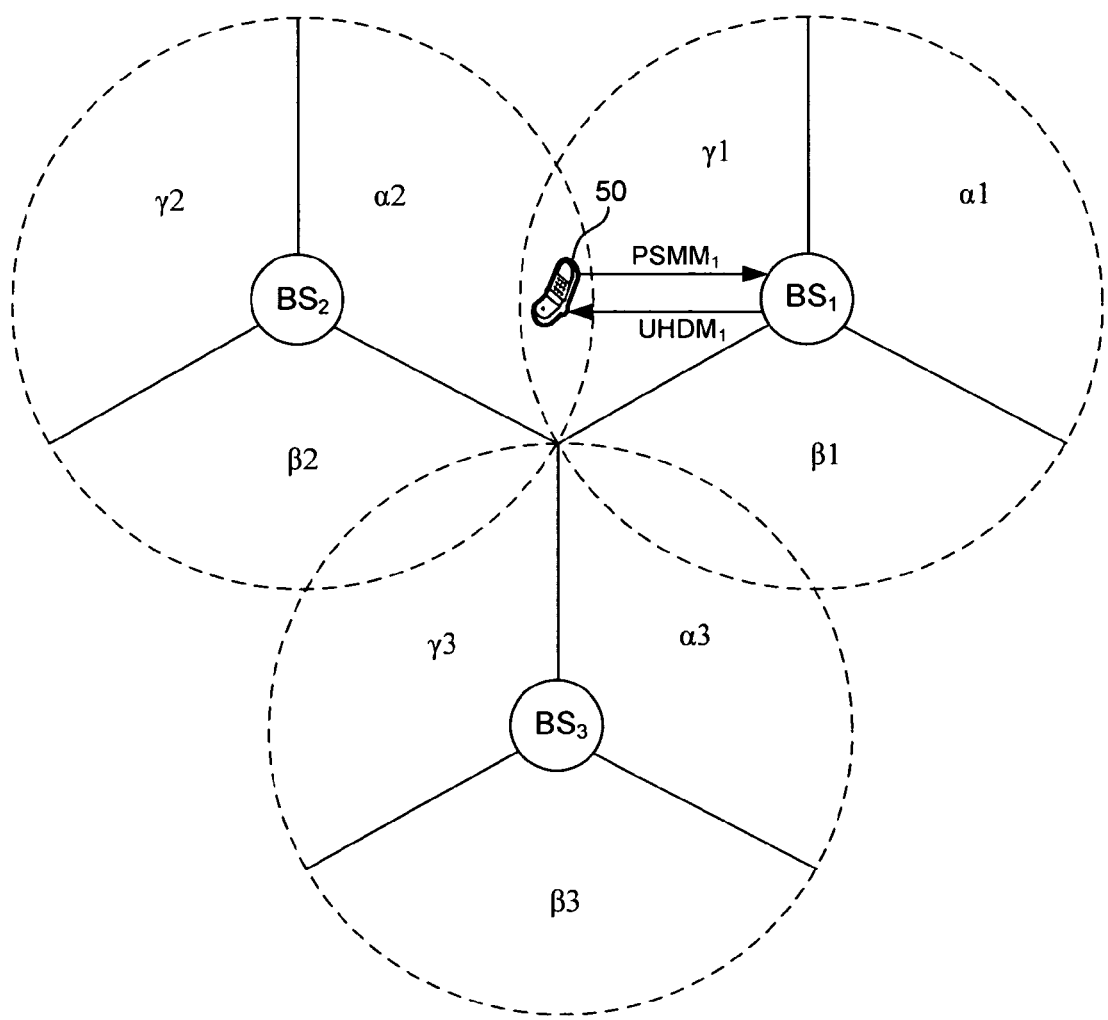
FIG. 5 shows an illustrative diagram with a failed soft handoff.

Referring to FIG. 5 there is shown a failed attempt to perform a soft handoff because the mobile station 50 has a smart antenna module. The illustrative smart antenna module is embodied as a digital signal processor that steers an antenna beam, shapes an antenna beam, and puts nulls into the beam to reject interference. The illustrative mobile station 50 moves to a location where there is an overlap between a plurality of RF signals generated by a first base station transmitter in sector $\gamma_1$ a second base station transmitter in sector $\alpha_2$. The illustrative smart antenna module proceeds to reject the signals generated by the second base station transmitter and does not send a PSMM to the serving base station. If there is no PSMM, the serving base station cannot permit a soft handoff to occur. The smart antenna module does not allow a soft handoff to occur, because the RF signals that may be used as soft handoff are interpreted to be interference.

Figure 6:
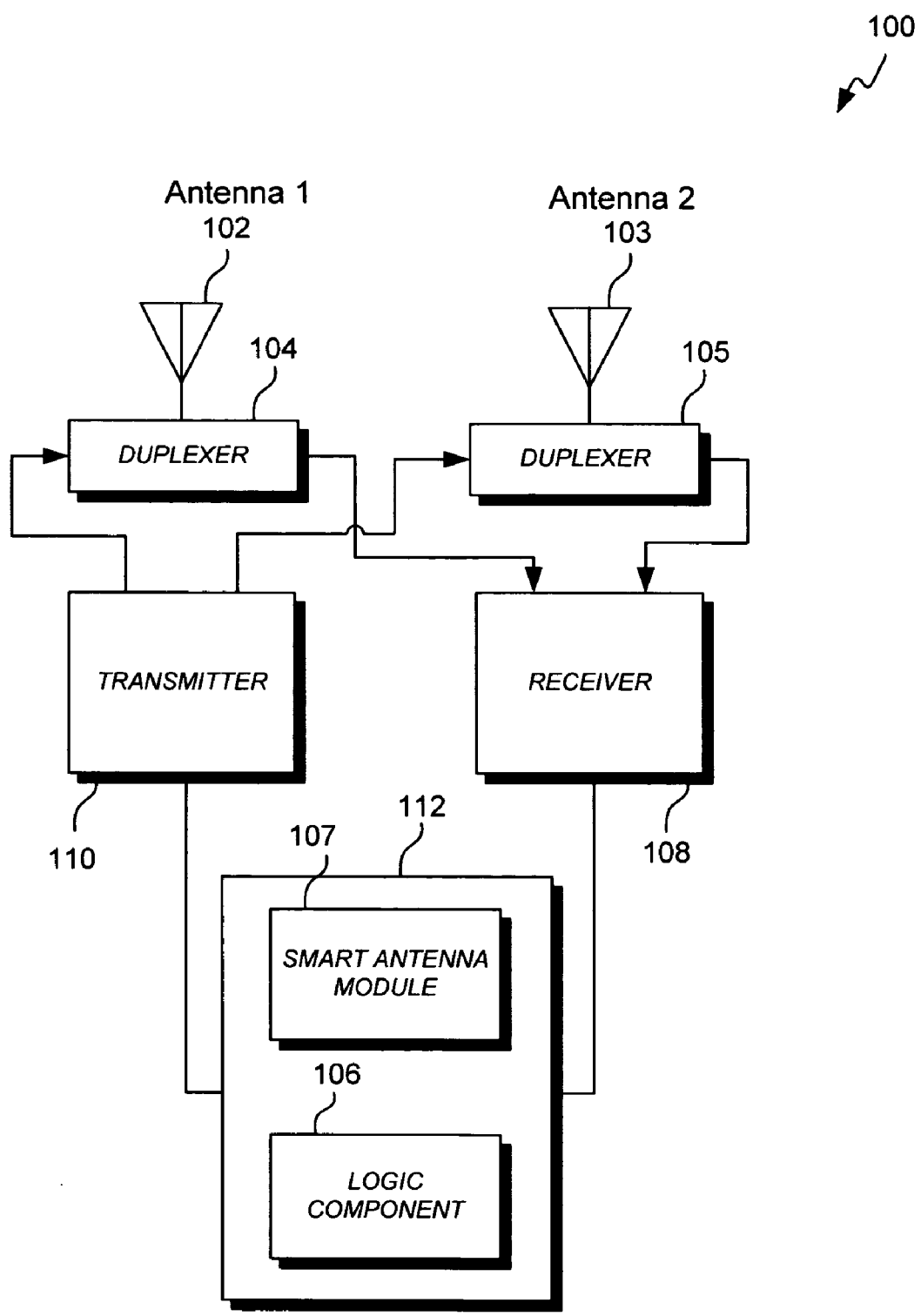
FIG. 6 shows an illustrative mobile station having a smart antenna, which is configured to perform a handoff.

Referring to FIG. 6 there is shown an illustrative mobile station having a smart antenna module and a logic component that is configured to perform a soft handoff. The illustrative first antenna element 102 is operatively coupled to a duplexer 104, and the second antenna element is operatively coupled to a duplexer 105. Each of the duplexers is in operative communication with a receiver 108 and a transmitter 110. A smart antenna module 107 and a logic component 106 are communicatively coupled to the transmitter 110 and receiver 108. For the illustrative embodiment, the receiver 108 can process signals from both antennas 102 and 103, and the combination of the receive antennas 102, 103 and the smart antenna module 107 provides an illustrative smart antenna.

The receiver 108 is configured to receive a plurality of RF signals that are communicated by one or more base station transmitters. For the illustrative example, a plurality of similar RF signals are communicated by a serving base station and by a second base station transmitter. If the RF signals from the serving base station exceed a first threshold (e.g. −10 dB), the smart antenna module 107 classifies the similar RF signals from the second base station transmitter as an interference signal.

The illustrative smart antenna module 107 acts like it is steering from one antenna configuration to another, when no steering is actually taking place. The digital signal processing permits the smart antenna to process a plurality of different antenna configurations at the same time. Alternatively, the smart antenna module may comprise an antenna that electrically changes its antenna configuration, so the antenna actually has steering elements and produces a steered beam.

By way of example and not of limitation, the logic component 106 is embodied in one or more digital signal processors (DSPs). The logic component 106 is configured to reclassify the similar RF signals from the second base station transmitter as a desired signal when the similar RF signals from the first base station, i.e. serving base station, are below a first threshold (e.g. −10.0 dB). By way of example and not of limitation, an RF signal that is below the illustrative first threshold is −10.1 dB. If the RF signals from the serving base station fall below this first threshold, then the logic component proceeds to measure a first signal strength for the first RF signals generated by the serving base station, and a second signal strength for the second RF signals generated by the second base station.

Additionally, the logic component 106 comprises a second threshold (e.g. −14 dB), which triggers the mobile station 100 to communicate the first signal strength and the second signal strength to the serving base station via transmitter 110. The transmitter 110 is in communication with logic component 106 and is configured to transmit a plurality of RF signals to one or more base stations. The plurality of RF signals communicated by the transmitter 110 comprises the PSMM described above.

In operation, the PSMM that is generated from the mobile station is "triggered" when the pilot signal strength from the second base station exceeds the second threshold. In an illustrative example, a PSMM is sent when the pilot signal strength from the second base station exceeds the second threshold is −13 dB.

The serving base station then sends an instruction, e.g. UHDM, which permits the mobile base station to simultaneously demodulate and combine similar RF signals generated by said serving base station, i.e. first base station, and by the second base station.

A method to permit soft handoffs is described in further detail below. The method communicates with the mobile station, base station, and CDMA network. By way of example and not of limitation, the method is embodied in the logic component 106 and the smart antenna module 107 described above. Alternatively, the logic component 106 and the smart antenna module 107 may be combined into a single module 112 that performs the functions described below.

Figure 7A:
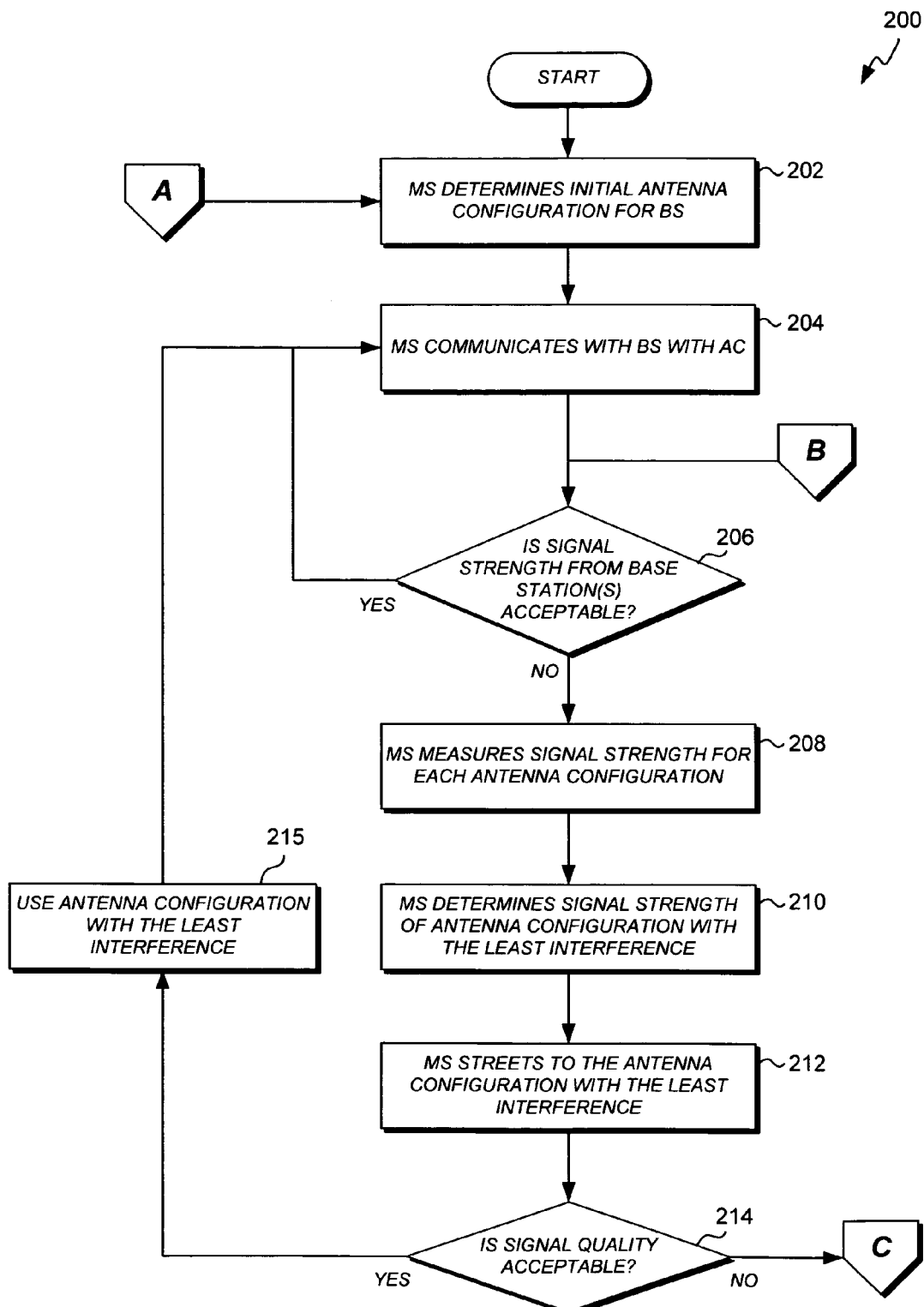
FIG. 7 shows an illustrative method for configuring the mobile station with a smart antenna to perform a handoff.
Figure 7B:
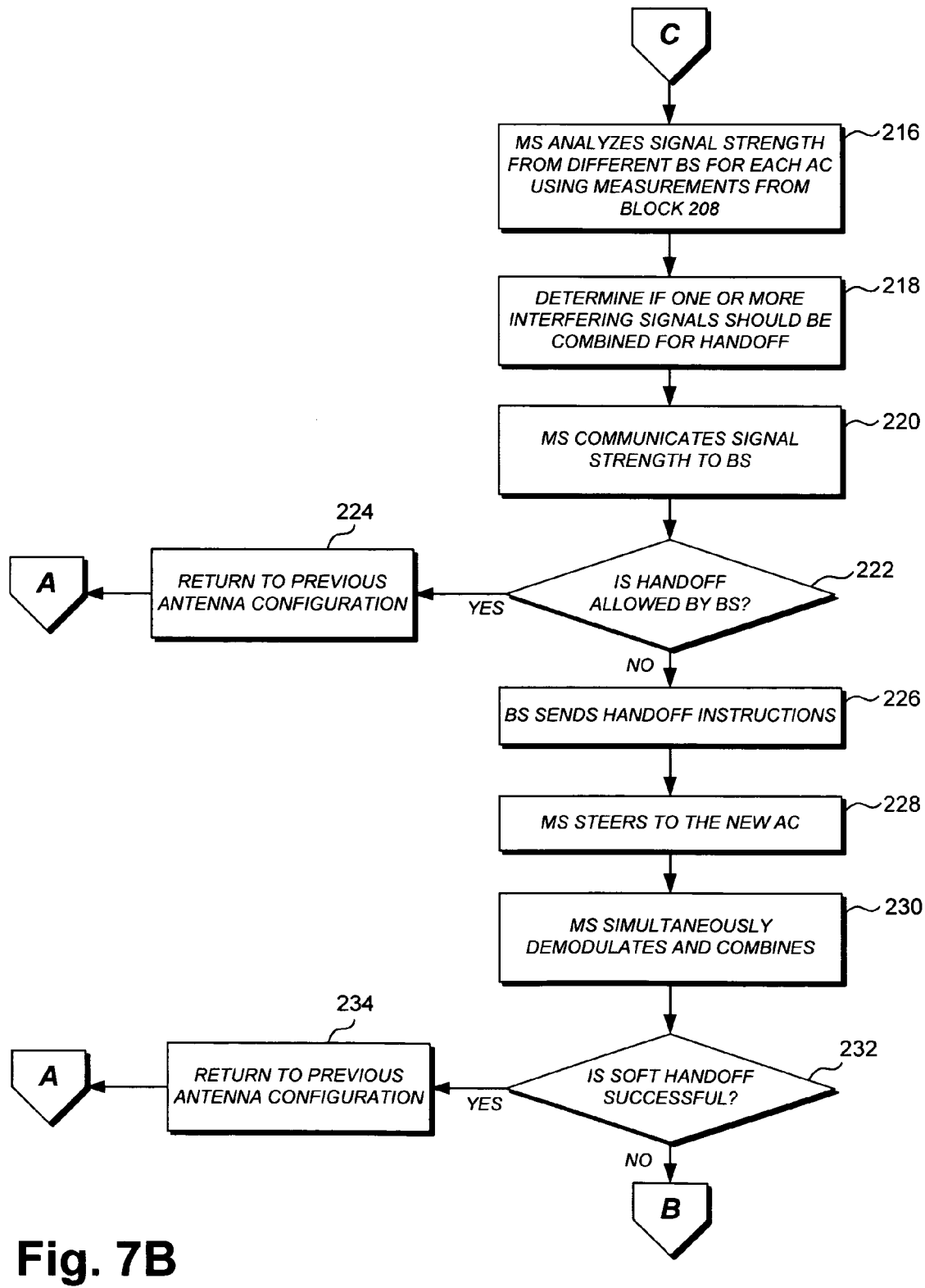

Referring to FIG. 7A and FIG. 7B there is shown a method 200 for configuring the mobile station with the smart antenna to perform a soft handoff, softer handoff, or any such handoff that requires simultaneously demodulating and combining two or more RF signals. As previously described, a soft handoff is the simultaneous demodulating and combining of RF signals transmitted by a first base station transmitter and a second base station transmitter. For illustrative purposes, the method described below is applied to the general case of a first base station transmitter, i.e. a serving base station, and a second base station transmitter. The serving base station transmitter and second base station transmitter may be disposed on the same base station or a separate base station.

The method is initiated at block 202 with a mobile station having a smart antenna module 107. Initially, the smart antenna module 107 determines an initial antenna configuration for communicating with the first base station transmitter. The smart antenna module 107 is embodied in the mobile station 100 as described above.

At block 204, the mobile station communicates with the illustrative first base station transmitter, i.e. serving base station, using this initial antenna configuration. As described above, the first base station transmitter occupies one of the sectors of the illustrative first base station. Initially, the mobile station 100 is configured to only receive communications from the serving base station transmitter, and is configured to identify the similar RF signals generated by the second base station transmitter as interference.

At decision diamond 206, the logic component of the mobile station decides whether the signal quality from the first base station transmitter or serving base station transmitter is acceptable. Note, the mobile station may be in handoff mode due to the successful handoff at decision diamond 232, which is described below. In the illustrative embodiment, a first threshold is established. By way of example and not of limitation, the first threshold is −10 dB. If the signal strength from the serving base station transmitter exceeds −10 dB, the method returns to block 204 where the mobile station continues to communicate with the serving base station and classifies RF signals from the illustrative second base station as interference. However, if the signal strength falls below the illustrative first threshold of (−10 dB), the method then proceeds to block 208.

At block 208, the mobile station proceeds to measure samples of received RF signals from each antenna configuration associated with one or more base stations. For the illustrative serving base station transmitter, the mobile station proceeds to measure signal strength, e.g. pilot signals, from the serving base station transmitter. Additionally, for the illustrative second base transmitter and every other detectable base station transmitter, the mobile station proceeds to measure the strength of the pilot signals generated by the second base station transmitter and each remaining base station transmitters.

By way of example and not of limitation, the logic component 106 of the mobile station 100 may be configured to store 20 ms samples of measurements for each antenna configuration. Note, each 20 ms sample will include measurements of signal strength for each base station transmitter. The logic component 106 is configured to determine the pilot strengths for each of the base station transmitters in each of the antenna configurations.

At block 210, the mobile station determines the signal strength of pilot signals at this optimal antenna configuration. At block 212, the mobile station then proceeds to "steer" to the antenna configuration having the least interference, the best signal level or the best signal-to-noise ratio. The smart antenna disposed on the mobile station is configured to select the optimal antenna configuration for communications with the serving base station transmitter.

At decision diamond 214, it is determined whether the signal quality is acceptable to the mobile station. By way of example, an illustrative threshold such as −10 dB is used to determine whether the illustrative pilot signal strength is acceptable. If the signal quality is above −10 dB, the method proceeds to block 214 where the antenna configuration from block 212 is used, and the mobile station continues receiving signals from the base station transmitter.

However, as the mobile station moves through the network, the signal quality may continue to degrade below the illustrative −10 dB threshold. At which point the method, then proceeds from decision diamond 214 to block 216. At block 216, the method proceeds to have the mobile station analyze signal strengths from different base station transmitters for each antenna configuration using the measurements from block 208. After having processed the data from all the antenna configurations in block 208, the logic component decides whether a different antenna configuration will be able to detect strong enough pilot signal strengths from other base station transmitters such that the overall signal quality can be improved. The signal strength that is measured includes the pilot signal Ec/Io, the RSSI, or T2P.

At block 218, the mobile station determines if one or more of the interfering signals should be combined for a handoff. The determination to combine signals in a soft handoff or softer handoff mode may be based on analyzing two or more thresholds. For example, the first threshold −10 dB triggers the evaluation of pilot signals from different base station transmitter at different antenna configuration. The second threshold may be a T_ADD threshold of −14 dB. The PSMM is generated when the pilot signal strength from the second base station exceeds the second threshold. In an illustrative example, the PSMM is sent when the illustrative pilot signal strength from the second base station is −13 dB. Thus, the PSMM is triggered when the second threshold, e.g. T_ADD threshold is exceeded. The first threshold, e.g. −10 dB, corresponds to communication with the serving base station and is used to determine if the mobile station 100 should evaluate other antenna configurations.

In the illustrative embodiment, a plurality of antenna configurations may be evaluated by the logic component. A statistical analysis for each of these antenna configuration may be performed as a function of time, so a snap shot is collected at times $T_1$, $T_2$, $T_3$, etc. The pilot signal strength at each time is measured and analyzed. The pilot signal strength may establish that the signal strength is increasing for one base station and decreasing for another base station. The decision to combine signals is thus based on the changes to signal quality as a function of time. Note, the term pilot signal strength is a measurement of pilot signal strength and should not be confused with the "message" that is generated by the Pilot Strength Measurement Message (PSMM).

Note, it may take up to 100 ms to 200 ms to perform the analysis. Since the RF environment may change in 100 ms to 200 ms, the method for determining whether to perform to a handoff must accommodate these 100 ms to 200 ms delays. A stochastic, statistical, neural, or other such mathematical model may be needed to analyze the RF environment in a real-time or pseudo real-time basis.

At block 220, the method proceeds to transmit the first signal strength and the second signal strength to the first base station transmitter. Thus, the mobile station assists the network by providing the network with information about the signal strength from one or more base station transmitters. Based on the signal strength reported by the mobile station, the serving base station, i.e. first base station, may allocate various resources to the mobile station. The allocation of resources from the base station may be in the form of increased traffic channel power and/or a command to the mobile station to go into handoff as described below.

At decision diamond 222, the determination is made of whether the handoff is allowed by the base station. Recall, in CDMA systems the CDMA network has control over which base stations the mobile station must communicate with.

In one embodiment, the network may determine that the similar RF signals communicated by two or more base station transmitter are "high priority" voice signals that need to be combined in a handoff scenario. This high priority voice signal is identified to each base station that is in communication with the mobile station. Generally, the voice signals would then proceed to block 226.

In another embodiment, the RF signals may be identified as "low priority" packet data that does not need to be combined in a handoff scenario because the packet data signals may take up too much bandwidth. Note, packet data is more robust and corruption of the data packets can be more easily corrected. Generally, packet data would not be treated like voice signals, and the handoff would not be allowed, so the method would proceed to block 224. However, if the quality of service (QoS) is high for the packet data, the handoff may be allowed and the method proceeds to block 226.

The base station may also determine that the handoff is not allowed for other reasons, so the method returns to the previous antenna configuration as described by block 224. However, if the handoff at decision diamond 222 is allowed, the method proceeds to block 226 where the serving base station sends a handoff instruction to the mobile station. Typically, the base station will re-send the same UHDM several times and if the message is not acknowledged by the mobile station, the base station will release the call. In this scenario, the mobile station has the option to return back to the original antenna configuration and demodulate the signal using the original base station assigned to the network. The mobile station should always acknowledge the base station with a message that the handoff message was completed.

The method then proceeds to block 228 where the mobile station steers to the new antenna configuration and will proceed to demodulate according to the new active set. At block 230, the mobile station begins to simultaneously demodulate the similar RF signals generated by the serving base station transmitter, i.e. first base station, and the second base station transmitter.

At decision diamond 232, the mobile station determines whether the handoff was successful. For example, if for some reasons, the new active set of base stations can no longer be detected with sufficient signal strength, a Handoff Completion Message will not be received by the base station and the handoff will not take place. If the determination is made that the handoff was not successful, the method returns to previous antenna configuration as described by block 234.

It is to be understood that the foregoing is a detailed description of illustrative embodiments. The scope of the claims is not limited to these specific embodiments. Various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A mobile station, comprising:
 a receiver configured to receive a plurality of similar RF signals from an antenna, wherein the similar RF signals are communicated by a serving base station and a second base station transmitter;
 a first mobile station threshold for classifying the similar RF signals, wherein if the RF signals from the serving base station exceed the first threshold, the similar RF signals from the second base station transmitter are classified as interference signals by the mobile station;
 a smart antenna module communicatively coupled to the receiver, the smart antenna module configured to generate a plurality of antenna configurations;
 a logic component in operative communication with the smart antenna, the logic component configured to reclassify the similar RF signals from the second base station transmitter as a desired signal when the similar RF signals from the serving base station are below the first threshold;
 a second mobile station threshold that is less than the first mobile station threshold, wherein if the second mobile station threshold is exceeded and the first mobile station threshold is not exceeded, a mobile station transmitter is configured to communicate a pilot signal strength message (PSSM) to the serving base station, wherein the PSSM includes a serving base station pilot strength generated by the serving base station and a second base station pilot strength generated by the second base station;
 a high priority status determined by the serving base station and the second base station transmitter, wherein the high priority status for voice signals allows a handoff from the serving base station to the second base station transmitter is allowed; and
 a low priority status associated with packet data wherein the handoff is not allowed.

2. The mobile station of claim 1, wherein the logic component is configured to receive an instruction from the serving base station transmitter to simultaneously demodulate and combine the similar RF signals generated by the first base station transmitter and the second base station transmitter.

3. The mobile station of claim 2 configured for a soft handoff, in which the serving base station transmitter and the second base station transmitter are each disposed on different base station locations.

4. The mobile station of claim 2 configured for a softer handoff, in which the serving base station transmitter and the second base station transmitter are each disposed on two different sectors in the same base station.

5. The mobile station of claim 4 configured for a soft softer handoff further comprising a third base station transmitter that generates the similar RF communications and a plurality of third RF signals that are received by the mobile station, wherein the third base station transmitter is disposed on another base station.

6. The mobile station of claim 1 wherein the plurality of similar RF signals are a plurality of packet data, in which the logic component is configured to simultaneously demodulate and combine the voice signals generated by the serving base station transmitter and the second base station transmitter.

7. The mobile station of claim 1 wherein the plurality of similar RF signals are a plurality of packet data, in which the logic component is configured to simultaneously demodulate and combine the voice signals generated by the serving base station transmitter and the second base station transmitter.

8. A communications method for a mobile station, comprising:
 receiving a plurality of similar RF signals from an antenna, wherein the similar RF signals are communicated by a serving base station and a second base station transmitter;
 classifying the similar RF signals with a first mobile station threshold, wherein if the RF signals from the serving base station exceed the first mobile station threshold, the similar RF signals from the second base station transmitter are classified as interference signals by the mobile station;
 using a logic component in operative communication with a smart antenna module that is configured to generate a plurality of antenna configurations, wherein the logic component is configured to reclassify the similar RF signals from the second base station transmitter as a desired signal when the similar RF signals from the serving base station are below the first threshold;

communicating a pilot signal strength message (PSSM) from a mobile station transmitter to the serving base station when a second mobile station threshold is exceeded and the first mobile station threshold is not exceeded, wherein the second mobile station threshold is less than the first mobile station threshold and the PSSM includes a serving base station pilot strength generated by the serving base station and a second base station pilot strength generated by the second base station;

determining a high priority status for voice signals by the serving base station and the second base station transmitter, wherein the high priority status allows a handoff from the serving base station to the second base station transmitter; and determining a low priority status associated with packet data, in which a handoff is not allowed.

9. The communications method of claim 8 further comprising receiving an instruction from the first base station transmitter to simultaneously demodulate and combine the similar RF signals generated by the serving base station transmitter and the second base station transmitter.

10. The method of claim 9 comprising performing the soft handoff in which the serving base station transmitter and the second base station transmitter are each disposed on different base station locations.

11. The method of claim 9 comprising performing a softer handoff in which the serving base transmitter and the second base station transmitter are both disposed on two different sectors in the same base station.

12. The method of claim 11 comprising performing a soft softer handoff by providing a third base station transmitter that generates the similar RF communications and a plurality of third RF signals that are received by the mobile station, the third base station transmitter disposed on a different base station location.

13. The method of claim 9 further comprising identifying the plurality of similar RF signals as a plurality of voice signals and then proceeding to combine and simultaneously demodulate the similar RF signals generated by the serving base station transmitter and the second base station transmitter.

14. The method of claim 9 further comprising identifying the plurality of similar RF signals as a plurality of packet data and then proceeding to combine and simultaneously demodulate the similar RF signals generated by the serving base station transmitter and the second base station transmitter.

* * * * *